United States Patent
Song et al.

(10) Patent No.: US 12,180,556 B2
(45) Date of Patent: Dec. 31, 2024

(54) HOT ROLLED STEEL SHEET HAVING EXCELLENT CRASHWORTHINESS AND METHOD FOR MANUFACTURING SAME

(71) Applicant: POSCO CO., LTD, Pohang-si (KR)

(72) Inventors: Tae-Jin Song, Gwangyang-si (KR); Sung-Il Kim, Gwangyang-si (KR); Chang-Sik Choi, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 29 days.

(21) Appl. No.: 18/025,836

(22) PCT Filed: Sep. 13, 2021

(86) PCT No.: PCT/KR2021/012411
§ 371 (c)(1),
(2) Date: Mar. 10, 2023

(87) PCT Pub. No.: WO2022/065772
PCT Pub. Date: Mar. 31, 2022

(65) Prior Publication Data
US 2023/0366053 A1    Nov. 16, 2023

(30) Foreign Application Priority Data

Sep. 22, 2020   (KR) .................. 10-2020-0122129

(51) Int. Cl.
C21D 8/02   (2006.01)
C21D 9/46   (2006.01)
(Continued)

(52) U.S. Cl.
CPC ......... C21D 8/0226 (2013.01); C21D 8/0263 (2013.01); C21D 9/46 (2013.01);
(Continued)

(58) Field of Classification Search
None
See application file for complete search history.

(56) References Cited

U.S. PATENT DOCUMENTS

| 11,236,412 B2* | 2/2022 | Sano ................... C23C 2/40 |
| 2008/0223491 A1 | 9/2008 | Kimijima |

(Continued)

FOREIGN PATENT DOCUMENTS

| CN | 109023036 A | 12/2018 |
| JP | 2008255484 | 10/2008 |

(Continued)

OTHER PUBLICATIONS

International Search Report—PCT/KR2021/012411 dated Dec. 24, 2021.

(Continued)

*Primary Examiner* — Daniel J. Schleis
(74) *Attorney, Agent, or Firm* — CANTOR COLBURN LLP

(57) ABSTRACT

Provided are a hot rolled steel sheet having excellent crashworthiness and a method for manufacturing same. The hot rolled steel sheet of the present invention contains, in weight %, 0.05-0.13% of carbon (C), 0.2-2.0% of silicon (Si), 1.3-3.0% of manganese (Mn), 0.01-0.1% of aluminum (Al), 0.001-0.05% of phosphor (P), 0.001-0.05% of sulfur (S), 0.001-0.02% of nitrogen (N), and the balance being Fe and other inevitable impurities, and has a steel microstructure comprising, in area %, 55% or more of bainitic ferrite, 10% or more of a martensite/austenite composite phase (MA), the sum of the bainitic ferrite and the martensite/austenite composite phase (MA) being 95% or more, and the remaining total being less than 5% of granular ferrite, retained austenite, and carbides.

8 Claims, 1 Drawing Sheet

(51) Int. Cl.
*C22C 38/00* (2006.01)
*C22C 38/02* (2006.01)
*C22C 38/04* (2006.01)
*C22C 38/06* (2006.01)
*C22C 38/60* (2006.01)
*C23C 2/06* (2006.01)
*C23C 2/40* (2006.01)
*C23G 1/00* (2006.01)

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/60* (2013.01); *C23C 2/06* (2013.01); *C23C 2/40* (2013.01); *C23G 1/00* (2013.01); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2016/0017465 A1 | 1/2016 | Toda et al. |
| 2018/0037980 A1 | 2/2018 | Wakita et al. |
| 2018/0127857 A1 | 5/2018 | Sun |
| 2018/0265939 A1 | 9/2018 | Rijkenberg et al. |
| 2021/0025019 A1 | 1/2021 | Hirashima et al. |
| 2021/0140005 A1 | 5/2021 | Yoshida et al. |

FOREIGN PATENT DOCUMENTS

| | | |
|---|---|---|
| JP | 2013112872 A | 6/2013 |
| JP | 2015196891 A | 11/2015 |
| JP | 5903880 | 4/2016 |
| JP | 2018532045 A | 11/2018 |
| KR | 20060051497 | 5/2006 |
| KR | 20060072196 | 6/2006 |
| KR | 100833076 | 5/2008 |
| KR | 20090070484 | 7/2009 |
| KR | 101758003 | 7/2017 |
| KR | 101980471 | 5/2019 |
| KR | 20200011475 | 2/2020 |
| KR | 20200047625 | 5/2020 |
| WO | 2014041801 | 3/2014 |
| WO | 2014041802 | 3/2014 |
| WO | 2016132545 A1 | 8/2016 |
| WO | 2017017933 A1 | 2/2017 |
| WO | 2020170710 A1 | 8/2020 |

OTHER PUBLICATIONS

Japanese Office Action—Japanese Application No. 2023-516578 issued on Mar. 26, 2024, citing WO 2017/017933, JP 2018-532045, JP 2013-112872, WO 2016/132545, JP 2015-196891, WO 2020/170710, US 2018/0127857, and CN 109023036.

* cited by examiner

HOT ROLLED STEEL SHEET HAVING EXCELLENT CRASHWORTHINESS AND METHOD FOR MANUFACTURING SAME

TECHNICAL FIELD

The present disclosure relates to a hot rolled steel sheet which may be used in a chassis structural member of a car and the like, and more particularly, to a high-strength hot rolled steel sheet having excellent collision resistance characteristics and a method of manufacturing the same.

BACKGROUND ART

In recent years, production and sales of environmentally friendly vehicles including electric vehicles are increasing rapidly for reducing global warming, and since parts such as engines and transmissions are excluded when an internal combustion engine vehicle is converted into an electric vehicle, the design of an electric vehicle is changing so that the vehicle front structure is shortened. Since the front structure has a function of absorbing energy of forward collisions when vehicle crash into each other, as well as a role of an engine bay, a structural member responsible for crashworthiness is also applied to a chassis parts under a car body in the designing of an electric vehicle, thereby complementing crashworthiness which may be lacking as the front structure of a car body is shortened. Since the crashworthiness of parts is proportional to the yield strength of a steel material, a method for improving the yield strength of a hot rolled steel sheet which is applied as a chassis parts is needed.

Meanwhile, since the chassis parts is positioned in the lower end of a vehicle's center of gravity, an effect of fuel saving by part weight reduction is very high. In order to maximize the weight reduction effect, technologies of improving the strength of a steel sheet while securing formability appropriate for press forming have been suggested.

As an example, Patent Document 1 suggests a method of manufacturing a steel sheet having a tensile strength of 950 MPa or more and excellent elongation and hole expandability, including finish rolling and maintaining the temperature in a range of 750 to 600° C. for a certain amount of time to form ferrite, which is then cooled to a martensite formation temperature range so that a microstructure is formed of 10 to 55% or more of ferrite and 45 to 90% of bainite and martensite. However, Patent Document 1 only considers the tensile strength and the formability of a steel sheet, but does not mention the improvement of yield strength for securing occupant safety in vehicle collisions.

Meanwhile, Patent Document 2 suggests a method of forming a microstructure of 90% or more of bainitic ferrite and controlling the fractions of martensite and bainite to 5% or less, respectively, for improving hole expandability. According to the method of Patent Document 2, a hot rolled steel sheet may secure 980 MPa or more of a tensile strength and 70% or more of hole expandability, but has a yield ratio of 0.8 or less, so that crashworthiness is deteriorated.

Patent Document 3 suggests a method of controlling a rolling temperature to be low to induce ferrite transformation during hot rolling for improving the yield strength of a steel sheet, and ferrite produced during rolling is work hardened by continuous hot rolling, thereby improving the yield strength of a steel sheet by work hardening of ferrite. However, Patent Document 3 may be appropriate for improving the yield strength of a steel sheet, but since it has a low rolling temperature, when deformation is applied to ferrite, texture develops, so that the difference due to the deformation direction of strength and formability become large, which may cause restrictions in parts forming.

Therefore, in order to maximize the weight reduction of a chassis parts, it is necessary to develop a steel material which has excellent strength and no anisotropy of formability, and in particular, has an excellent yield strength to secure occupant safety in vehicle crash.

RELATED ART DOCUMENT (Patent Document 1) Korean Patent Laid-Open Publication No. 2012-0011475

(Patent Document 2) Korean Patent Laid-Open Publication No. 2008-255484

(Patent Document 3) Korean Patent Laid-Open Publication No. 2020-0047625

DISCLOSURE

Technical Problem

An aspect of the present disclosure is to provide a hot rolled steel sheet which has a high yield strength to have excellent crashworthiness, and a method for manufacturing the same.

Meanwhile, the object of the present disclosure is not limited to the above description. The object of the present disclosure will be understood from the entire contents of the present specification, and a person skilled in the art to which the present disclosure pertains will understand an additional object of the present disclosure without difficulty.

Technical Solution

According to an aspect of the present disclosure, a high-strength hot rolled steel sheet having an excellent yield strength includes, by weight: 0.05 to 0.13% of carbon (C), 0.2 to 2.0% of silicon (Si), 1.3 to 3.0% of manganese (Mn), 0.01 to 0.1% of aluminum (Al), 0.001 to 0.05% of phosphorus (P), 0.001 to 0.05% of sulfur (S), and 0.001 to 0.02% of nitrogen (N), with a balance of Fe and other inevitable impurities, wherein a steel microstructure includes, by area: 55% or more of bainitic ferrite and 10% or more of a martensite/austenite (MA) composite phase, the sum of the bainitic ferrite and the martensite/austenite (MA) composite phase being 95% or more and the remaining total being less than 5% of granular ferrite, residual austenite, and carbides, in the bainitic ferrite, an area fraction of bainitic ferrite having an intragrain orientation difference of 1.5° or more and 10.5° or less is 55% or more of the total area of the bainitic ferrite, and the martensite/austenite (MA) composite phase has an average particle diameter of 2.0 μm or less and an average interval of 0.3 μm or more.

The hot rolled steel sheet may further include one or more of, by weight: 0.01 to 2.0% of chromium (Cr), 0.01 to 2.0% of molybdenum (Mo), 0.01 to 0.2% or titanium (Ti), and 0.01 to 0.1% of niobium (Nb).

The martensite/austenite (MA) composite phase may have an area fraction of 10 to 45%.

The hot rolled steel sheet may have yield strength of 750 MPa or more, a tensile strength of 950 MPa or more, an elongation of 8% or more, a hole expandability of 25% or more, and a difference in elongations measured in a vertical rolling direction and a parallel rolling direction of 3% or less.

According to another aspect of the present disclosure, a method for manufacturing a high-strength hot rolled steel sheet having an excellent yield strength includes:

reheating a steel slab having the alloy composition described above at 1100 to 1350° C.;

finish hot rolling the reheated steel slab while controlling the sum of reduction amounts of the final two rolling passes to 10 to 40% in which FDT (° C.) which is a temperature of a hot rolled sheet immediately after the finish hot rolling satisfies the following Relations 1 and 2 at a temperature between 750° C. and 1150° C.;

first cooling the hot rolled steel sheet to a temperature of T1 defined in the following Relation 3 or lower between Ms and 520° C. at a cooling rate of 50° C./s or more, and then, second cooling the steel sheet to a coiling temperature between $T_1$ and Ms−50° C. at a cooling rate of 50° C./s or less; and finally cooling the hot rolled steel sheet coiled after the second cooling to room temperature.

[Relation 1]

FDT≥TNR −50° C.

wherein Tnr is a temperature at which recrystallization delay starts with Tnr=795+88×[C]+45×[Mn]+23×[Cr]+760×[Ti]+480×[Nb]−80×[Si], and each element refers to % by weight thereof, Relation [2]

Du=3.7+0.36×[C]−1.21×[Si]−0.23×[Mn]−0.19×[Cr]−41.63×[Ti]−54.44×[Nb]+0.049×[FDT−773]≤10, wherein Du is an indicator showing an effective crystal grain size of austenite immediately before the first cooling after the finish hot rolling, and each element refers to % by weight thereof, $$k(t) = \frac{20}{D_u}\exp\left\{-\left(\frac{T_1 + 273 - T_D}{112}\right)^{1.92}\right\} \geq 7.0 \times 10^{-3} \quad \text{[Relation 3]}$$

wherein $T_D$=820−290×[C]−90×[Mn]−70×[Cr]−62×[Mo]−35×[Si], and each element refers to weight contents thereof.

Ms is a temperature at which martensite transformation starts by cooling with Ms=550−330×[C]−41×[Mn]−20×[Cr]−10×[Mo]+30×[Al]−20×[Si], in ° C., and each element refers to % by weight thereof.

The hot rolled steel sheet may further include one or more of, by weight: 0.01 to 2.0% of chromium (Cr), 0.01 to 2.0% of molybdenum (Mo), 0.01 to 0.2% or titanium (Ti), and 0.01 to 0.1% of niobium (Nb).

A step of pickling and oiling the finally cooled steel sheet may be further included.

After the pickling, a step of heating the finally cooled steel sheet to a temperature within a range of 400 to 750° C. to perform hot dip galvanizing may be further included.

Advantageous Effects

As set forth above, according to an exemplary embodiment in the present disclosure, a high-strength hot rolled steel sheet having an excellent yield strength, which has yield strength of 750 MPa or more, a tensile strength of 950 MPa or more, and a difference in elongations measured in a vertical rolling direction and a parallel rolling direction of 3% or less, may be provided.

BEST MODE FOR INVENTION

Figure 1:
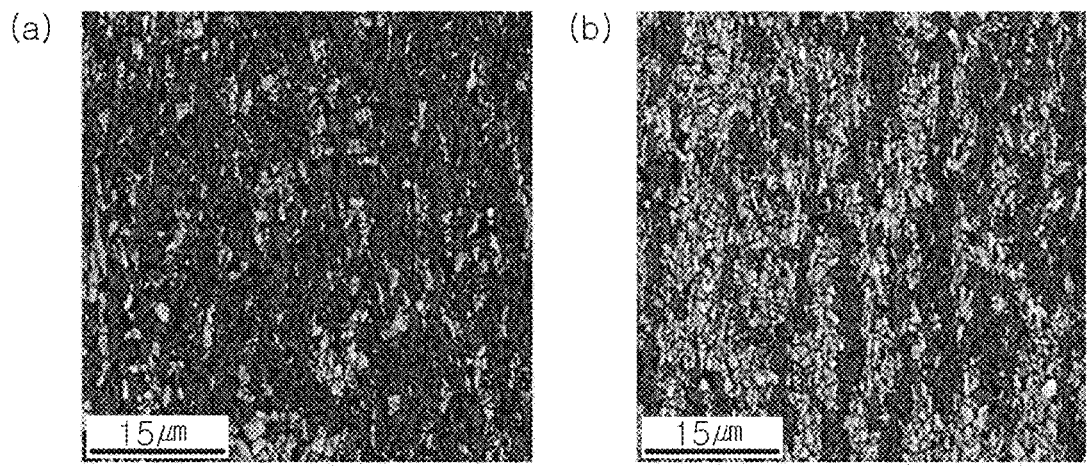
FIG. 1 is an image in which the steel microstructure in an exemplary embodiment in the present disclosure is observed by a rear electron diffraction scattering method attached to a scanning electron microscope, in which (a) shows the case of Inventive Example 1, and (b) shows the case of Comparative Example 4.

Hereinafter, preferable exemplary embodiments in the present disclosure will now be described. However, the embodiments in the present disclosure may be modified in many different forms and the scope of the present disclosure should not be limited to the embodiments set forth herein. Rather, these embodiments are provided so that the present disclosure will be thorough and complete, and will fully convey the concept of the present disclosure to those skilled in the art.

The present inventors recognized that in a conventional hot rolled steel sheet, a steel material having a tensile strength of 950 MPa or more may be manufactured, but it has a problem of having a low yield strength to have poor crashworthiness, and thus, conducted intensive study for solving the problem.

They confirmed that in order to increase the yield strength, it is effective to improve strength by increasing a dislocation density of a matrix structure in a microstructure formed of a composite phase, but when work hardening is performed by applying deformation after phase transformation or during phase transformation of the matrix structure, the yield strength is improved, but a material difference by forming direction is increased due to the formation of texture, so that anisotropy is deteriorated.

Meanwhile, bainite is defined as a composite structure formed of bainitic ferrite produced by shear transformation (displacive phase transformation) which does not involve diffusion and a secondary product produced by diffusion of interstitial alloying elements such as carbon, and the secondary product may be present as carbide, pearlite, a martensite/austenite composite phase depending on the temperature of bainite production and the kind of alloying elements.

Since bainitic ferrite is produced by shear transformation, screw dislocation is arranged regularly in the structure for reducing a shear deformation amount produced during transformation. Further, blade dislocation which produced for accommodating volume expansion involved in production of bainitic ferrite in austenite is accumulated in a bainitic ferrite matrix after transformation has progressed, thereby completing transformation. Therefore, the dislocation density of bainitic ferrite is at a high level, so that it is appropriate for improving the yield strength of steel without a problem of deteriorating anisotropy. However, the density of dislocation produced inside the bainitic ferrite gradually decreases by a recovery phenomenon while the temperature is maintained in a temperature range of a room temperature or higher in which bainite transformation proceeds, and thus, the inventors realized that it is important to manage the dislocation density in the bainitic ferrite to maintain an appropriate level and conducted study thereof. As a result, the inventors recognized that a steel sheet having excellent crashworthiness and high strength maybe obtained by optimizing the fraction and the size of the matrix structure and secondary phase of a microstructure, by appropriately controlling the alloy composition range and the hot rolling and cooling conditions of a steel sheet, thereby completing the present disclosure.

Hereinafter, the hot rolled steel sheet having excellent yield strength according to an aspect of the present disclosure will be described in detail.

The hot rolled steel sheet having excellent yield strength according to an aspect of the present disclosure includes, by weight: 0.05 to 0.13% of carbon (C), 0.2 to 2.0% of silicon (Si), 1.3 to 3.0% of manganese (Mn), 0.01 to 0.1% of aluminum (Al), 0.001 to 0.05% of phosphorus (P), 0.001 to 0.05% of sulfur (S), and 0.001 to 0.02% of nitrogen (N), with a balance of Fe and other inevitable impurities, bainitic ferrite, wherein a steel microstructure includes, by area: 55% or more of bainitic ferrite and 10% or more of a martensite/austenite (MA) composite phase, the sum of the bainitic ferrite and the martensite/austenite (MA) composite phase being 95% or more and the remaining total being less than 5% of granular ferrite, residual austenite, and carbides; in the bainitic ferrite, an area fraction of bainitic ferrite having an intragrain orientation difference of 1.5° or more and 10.5° or less is 55% or more of the total area of the bainitic ferrite; and the martensite/austenite (MA) composite phase has an average particle diameter of 2.0 µm or less and an average interval of 0.3 µm or more.

Hereinafter, the reasons for limiting the alloy composition of the hot rolled steel sheet of the present disclosure will be described in detail. Herein, unless otherwise stated, the content of each element refers to wt %.

Carbon (C): 0.05 to 0.13%

Carbon (C) is an element which is most economical and effective for reinforcing steel. As the content of C increases, the production of granular ferrite during cooling is suppressed to contribute to an increase in a bainite structure fraction, and carbon diffuses to austenite during bainite transformation to stabilize austenite, thereby remaining as a martensite/austenite (MA) composite phase in a final cooling process to improve tensile strength.

When the content of C is less than 0.05%, the fraction of martensite/austenite (MA) composite phase is low, so that tensile strength may not be secured. However, the content is more than 0.13%, tensile strength is excessively increased, and formability and weldability are deteriorated. Therefore, it is preferable in the present disclosure that the content of C is 0.05 to 0.13%. More preferably, the C content may be 0.06 to 0.11%.

Silicon (Si): 0.2 to 2.0%

Silicon (Si) is an element which improves hardenability of steel, and serves to improve strength as a solid solution strengthening effect. In addition, the formation of carbides after bainite transformation is delayed, so that a secondary phase becomes a martensite/austenite (MA) composite phase to improve tensile strength.

When the content of Si is less than 0.2%, carbides are formed, and thus, the fraction of the martensite/austenite composite phase is low, so that it is difficult to secure tensile strength. However, when the content is more than 2.0%, a Fe—Si composite oxide is formed on the surface of a slab during reheating, so that steel sheet surface quality is deteriorated and weldability is lowered. Therefore, it is preferable in the present disclosure that the content of Si is 0.2 to 2.0%. More preferably, the Si content may be 0.3 to 1.2%.

Manganese (Mn): 1.3 to 3.0%

Manganese (Mn) is an element which improves hardenability of steel, and prevents formation of granular ferrite during cooling after finish rolling so that the formation of bainite is facilitated.

When the content of Mn is less than 1.3%, hardenability lacks, so that the fraction of granular ferrite is excessively increased. However, when the content is more than 3.0%, hardenability is greatly increased, so that bainite transformation does not occur well in a cooling zone, and thus, the dislocation density in bainitic ferrite is rather decreased due to a temperature rise by recuperative heat after coiling and a risk of buckling occurrence is caused. Therefore, in the present disclosure, the content of Mn is preferably 1.3 to 3.0%, and more preferably 1.8 to 2.3%.

Aluminum (Al) : 0.01 to 0.1%

Aluminum (Al) is an element which is added for deoxidation, and is partly present in steel after deoxidation. When an Al content is more than 0.1%, an increase in oxide and nitride-based inclusions in steel is caused to deteriorate the formability of a steel sheet. Meanwhile, when Al is excessively reduced to less than 0.01%, an increase in unnecessary refining cost is caused. Therefore, it is preferable in the present disclosure that the content of Al is 0.01 to 0.1%.

Phosphorus (P): 0.001 to 0.05%

Phosphorus (P) is an impurity which is unavoidably contained, and is an element which is the main cause of reducing workability of steel by segregation, and thus, it is preferable to control the content to be as low as possible. Theoretically, it is favorable that a phosphorus content is limited to 0%, but the manufacturing cost is excessively increased in order to decrease the P content to less than 0.001%. Therefore, it is preferable in the present disclosure that the content of P is 0.001 to 0.05%.

Sulfur (S): 0.001 to 0.05%

Sulfur (S) is an impurity which is unavoidably contained, and is an element which is bonded to Mn and the like to form inclusion, resulting in deterioration of workability of steel, and thus, it is preferable to control the content to be as low as possible. Theoretically, it is favorable that a sulfur content is limited to 0%, but the manufacturing cost is excessively increased in order to decrease the S content to less than 0.001%. Therefore, it is preferable in the present disclosure that the content of S is 0.001 to 0.05%.

Nitrogen (N): 0.001 to 0.02%

Nitrogen is an impurity which is unavoidably contained, and is an element which acts with aluminum to precipitate fine nitrides to reduce workability of steel, and thus, it is preferable to control the content to be as low as possible. Theoretically, it is favorable that a nitrogen content is limited to 0%, but the manufacturing cost is excessively increased in order to decrease the N content to less than 0.001%. Therefore, it is preferable in the present disclosure that the content of N is 0.001 to 0.02%.

In addition, the present disclosure may further include one or more of: 0.01 to 2.0% of chromium, 0.01 to 2.0% of molybdenum, 0.01 to 0.2% of titanium (Ti), and 0.01 to 0.1% of niobium (Nb), if necessary, in addition to the composition components described above.

Chromium (Cr): 0.01 to 2.0%

Chromium (Cr) is an element which improves hardenability of steel, and suppresses the formation of ferrite during cooling after finish rolling to facilitate the formation of bainite. When a Cr content is less than 0.01%, an effect of addition may not be sufficiently obtained. However, when the content is more than 2.0%, hardenability is excessively increased, so that bainite transformation in a cooling zone does not occur well. Therefore, in the present disclosure, the content of Cr is preferably 0.01 to 2.0%, more preferably 0.1 to 1.5%.

Molybdenum (Mo): 0.01 to 2.0%

Molybdenum (Mo) is an element which improves hardenability of steel, and serves to improve strength by an effect of solid solution strengthening, and thus, prevents the formation of ferrite during cooling after finish rolling to facilitate the formation of bainite. Mo slows down a diffusion rate of carbon to delay a bainite transformation rate, and thus, when the content is more than 2.0%, bainite transformation does not occur well in a cooling zone. Meanwhile, when the content is less than 0.01%, an effect of addition to suppress ferrite production during cooling after finish rolling may not be sufficiently obtained. Therefore, in the present disclosure, the content of Mo is preferably 0.01 to 2.0%, more preferably 0.05 to 1.0%.

Titanium (Ti): 0.01 to 0.2%

Titanium (Ti) is an element which forms a carbonitride and renders austenite crystal grains fine by recrystallization delay during hot rolling, and thus, promotes bainite transformation in a cooling zone and renders the particle size of a martensite/austenite (MA) composite phase in a microstructure fine, thereby improving steel strength. When a Ti content is less than 0.01%, an effect of addition may not be sufficiently obtained. Meanwhile, when the Ti content is more than 0.2%, coarse carbonitride is produced to lower the toughness of a steel sheet. Therefore, in the present disclosure, the content of Ti is preferably 0.01 to 0.2%, and more preferably 0.02 to 0.10%.

Niobium (Nb): 0.01 to 0.1%

Niobium (Nb) is an element which forms a carbonitride, similarly to Ti. When niobium is added, austenite crystal grains become fine by recrystallization delay during hot rolling, and thus, bainite transformation in a cooling zone is promoted and the particle size of a martensite/austenite (MA) composite phase in a microstructure becomes fine, thereby improving steel strength. When the content of Nb is less than 0.01%, an effect of addition may not be sufficiently obtained, and when the content is more than 0.1%, a coarse carbonitride is produced to decrease the toughness of a steel sheet and increase a rolling load during rolling to deteriorate workability. Therefore, in the present disclosure, the content of Nb is preferably 0.01 to 0.1%, and more preferably 0.01 to 0.05%.

The remaining component of the present disclosure is iron (Fe). However, since in the common manufacturing process, unintended impurities may be inevitably incorporated from raw materials or the surrounding environment, the component may not be excluded. Since these impurities are known to any person skilled in the common manufacturing process, the entire contents thereof are not particularly mentioned in the present specification.

It is preferable that the steel sheet of the present disclosure satisfying the alloy component described above has the sum of area fractions of bainitic ferrite and a martensite/austenite composite phase (MA, martensite-austenite constituents) of 95% or more. When the sum of the area fractions of bainitic ferrite and a martensite/austenite (MA) composite phase is less than 95%, the excellent yield strength and tensile strength intended in the present disclosure may not be secured. Here, the area fraction occupied by the bainitic ferrite in the steel microstructure is preferably 55% or more, and when the area fraction is less than 55%, yield strength of 750 MPa or more may not be secured.

Furthermore, in the bainitic ferrite, an area fraction of bainitic ferrite having an intragrain orientation difference of 1.5° or more and 10.5° or less is preferably 55% or more of the total area of the bainitic ferrite.

The important characteristic of the present disclosure is to control the dislocation density of bainitic ferrite forming a matrix structure to an appropriate level. The dislocation in bainitic ferrite remains in the structure by delayed recovery of dislocation occurring in shear transformation, or after coiling, austenite transforms into martensite which is introduced to the bainitic ferrite structure so that the dislocation remains. The dislocation density in the bainitic ferrite may be theoretically measured by measuring the thickness using a transmission electron microscope and calculating the number of dislocations observed, but the method is not economical when the distribution by particle position of the dislocation density is considered, and thus, the dislocation density is indirectly quantified by electron back scatter diffraction (EBSD) phase interpretation. The intragrain orientation difference is a value calculated after independent crystal grains is defined as those having an orientation difference between adjacent grains of 15° or more. Meanwhile, when the intragrain orientation difference is 10.5° or more, it maybe confused with a variant of adjacent bainitic ferrite, and thus, the upper limit is set to 10.5°, and when the intragrain orientation difference is less than 1.5°, it corresponds to the measurement deviation range of EBSD interpretation and has reduced accuracy. In the present disclosure, when bainitic ferrite having an intragrain orientation difference of 1.5° to 10.5° accounts for 55% or more of the total area of bainitic ferrite, it is confirmed that yield strength is improved. More preferably, 60% or more may be included. It is not necessary to limit the upper limit, but when it is more than 95%, an elongation may be deteriorated, and thus, it is preferable to manage the upper limit to 95% or less.

Meanwhile, it is preferable that the area fraction of the martensite/austenite (MA) composite phase is 10% or more. In the present disclosure, the martensite/austenite (MA) composite phase is dispersed in the structure and acts as an obstacle which impedes the movement of dislocations, thereby improving the tensile strength of steel, and also, austenite transforms into martensite during cooling after coiling, thereby introducing additional dislocations into bainitic ferrite to improve the yield strength of steel. When the area fraction of the martensite/austenite (MA) composite phase is less than 10%, the tensile strength and the yield strength to be intended may not be expected to be improved. Meanwhile, when the area fraction of the martensite/austenite (MA) composite phase is excessive, the strength of steel is excessively increased and formability is deteriorated. Therefore, in the present disclosure, the area fraction of the martensite/austenite (MA) composite phase is preferably 10 to 45%, more preferably 15 to 35%.

Here, the martensite/austenite (MA) composite phase may have an average particle diameter of 2.0 μm or less and an average interval of 0.3 μm or more. Since the martensite/austenite (MA) composite phase improves the tensile strength of steel with a mechanism such as dispersion reinforcement, when it is evenly dispersed with fine size, it has high reinforcement efficiency. The present inventors confirmed that when the martensite/austenite (MA) composite phase has an average particle diameter of 2.0 μm or less and an average interval of 0.3 μm or more, hole expandability becomes excellent. It is preferable that hole expandability is excellent, considering that a chassis part is often manufactured by Burring forming. Usually, the hole expandability of steel using the martensite/austenite (MA) composite phase is not excellent due to a large hardness difference from a matrix structure, but it was confirmed when a dislocation is introduced to a matrix structure to reduce a hardness difference and the size of the martensite/austenite (MA) composite phase is finely controlled to prevent local concentration of deformation as in the present disclosure, good hole expandability may be secured. It is preferable that the martensite/austenite (MA) composite phase has an average particle diameter of 2.0 μm or less for preventing the local concentration of deformation, and an average interval of 0.3 μm or more so that the concentrations of deformation occurring at different positions do not overlap.

Besides, in the present disclosure, the steel microstructure may include a total of 5% or less of granular ferrite, residual austenite, and carbides.

Since ferrite produced during cooling after finish rolling is usually produced by diffusion transformation, it is characterized by low strength. However, when it is added at less than 5% as in the present disclosure, austenite remaining after ferrite production transforms into bainite and martensite, and during the transformation, previously produced ferrite is also subjected to shear deformation for accommodating particle deformation, and thus, it was confirmed that the dislocation density inside granular ferrite is maintained at a high level, so that the strength of steel is not greatly decreased. Meanwhile, when it is present at 5% or more, the strength of steel is decreased, and thus, it is necessary to manage the upper limit to less than 5%.

When bainite transformation proceeds during cooling in a cooling zone or after coiling, carbon diffuses and moves from bainitic ferrite into untransformed austenite. The diffusion coefficient of carbon in austenite is significantly deteriorated so that a carbon concentration inside austenite has a non-uniform distribution, and in an area where carbon is locally excessively concentrated, carbon does not transform into martensite during cooling to room temperature and remains in austenite. Since the phase stability of the residual austenite is not at a high level, even in the case in which austenite is observed after manufacturing a steel sheet, most of the austenite transforms into martensite by plastic induced transformation in the step of manufacturing parts and applying deformation, thereby increasing the tensile strength of steel. Therefore, in the present disclosure, fractions of martensite and austenite are not separately managed. However, when the content of the austenite is excessively high, an embrittlement phenomenon related to hydrogen integration may be caused, and thus, it is necessary to manage the upper limit to less than 5%.

During bainite transformation, an iron carbide may be produced together with diffusion of carbon into austenite. In the present disclosure, since strength is improved by using the martensite/austenite (MA) composite phase, production of an iron carbide may cause a decrease in the fraction of the martensite/austenite (MA) composite phase. Therefore, excessive production of the iron carbide impairs a reinforcement effect intended in the present disclosure. Meanwhile, when Ti and Nb are added, an alloy carbonitride may exist. In this case, an additional reinforcement effect by refinement of crystal grains maybe expected, but since a coarse carbide decrease the toughness of steel, it is necessary to manage a carbide present in steel to have an area fraction of less than 5%.

The steel sheet of the present disclosure having the alloy composition and the microstructure described above has yield strength of 750 MPa or more, a tensile strength of 950 MPa or more, an elongation of 8% or more, and a hole expandability of 25% or more, and thus, may secure excellent crashworthiness.

Next, a method for manufacturing a high-strength hot rolled steel sheet having an excellent yield strength which is another aspect of the present disclosure will be described in detail.

The high-strength hot rolled steel sheet having an excellent yield strength according to the present disclosure may be manufactured by a series of processes of reheating-hot rolling-cooling-coiling of a steel slab having the alloy composition as described above. Specifically, the method for manufacturing a hot rolled steel sheet of the present disclosure includes: reheating a steel slab having the alloy composition described above at 1100 to 1350° C.; finish hot rolling the reheated steel slab while controlling the sum of reduction amounts of the final two rolling passes to 10 to 40% in which FDT (° C.) which is a temperature of a hot rolled sheet immediately after the finish hot rolling satisfies the following Relations 1 and 2 at a temperature between 750° C. and 1150° C.; first cooling the hot rolled steel sheet to a temperature of T1 defined in the following Relation 3 or lower between Ms and 520° C. at a cooling rate of 50° C./s or more, and then, second cooling the steel sheet to a coiling temperature between T1 and Ms−50° C. at a cooling rate of 50° C./s or less; and finally cooling the hot rolled steel sheet coiled after the second cooling to room temperature.

Hereinafter, each manufacturing process condition will be described in detail.

Steel Slab Reheating

In the present disclosure, it is preferable to perform a process of reheating a steel slab to be homogenized before performing hot rolling, in which the reheating process is performed preferably at 1100 to 1350° C. When the reheating temperature is lower than 1100° C., homogenization of an alloy element is insufficient. However, when the temperature is higher than 1350° C., an oxide is excessively formed on the surface of a slab to deteriorate the surface quality of a steel sheet, which is thus not preferable.

Hot Rolling

The reheated steel slab is hot rolled to manufacture a hot rolled steel sheet. Here, it is preferable that rolling is performed while controlling the sum of reduction amounts of the final two rolling passes to 10 to 40% in which FDT (° C.) which is a temperature of a hot rolled sheet immediately after the finish hot rolling satisfies the following Relations 1 and 2 at a temperature between 750° C. and 1150° C.

[Relation 1]

$$FDT \geq Tnr-50° C.$$

wherein Tnr is a temperature at which recrystallization delay starts with $Tnr=795+88\times[C]+45\times[Mn]+23\times[Cr]+760\times[Ti]+480\times[Nb]-80\times[Si]$, and each element refers to % by weight thereof,

[Relation 2]

$Du=3.7+0.36\times[C]-1.21\times[Si]-0.23\times[Mn]-0.19\times[Cr]-41.63\times[Ti]-54.44\times[Nb]+0.049\times[FDT-773]\leq10$, wherein Du is an indicator showing an effective crystal grain size of austenite immediately before the first cooling after the finish hot rolling, and each element refers to % by weight thereof, When the hot rolling starts at a temperature higher than 1150° C. of FDT, oxides are excessively produced on the surface of the steel sheet after rolling and are not effectively removed even after pickling to deteriorate surface quality. Meanwhile, hot rolling is performed at a temperature lower than 750° C. of FDT, a rolling load is excessively increased to deteriorate workability, and ferrite is produced during rolling to deteriorate anisotropy.

It is preferable to perform finish hot rolling so that the sum of reduction amounts of the final 2 passes is 10 to 40%. Usually, the important reason for performing hot rolling as multi-stage rolling is to reduce a rolling load and control the thickness precisely, and when the sum of reduction rates of the final 2 passes is more than 40%, the rolling load of the final 2 passes is excessively increased to deteriorate workability. However, when the sum of reduction rates of the final 2 passes is less than 10%, the temperature of the steel sheet is rapidly lowered to deteriorate workability.

The steel sheet during hot rolling or after hot rolling undergoes work hardening, recovery, and recrystallization, in which the crystal grain size and the internal energy of austenite change. It is common to minimize the formation of texture by controlling FDT which is a finish hot rolling temperature to Tnr which is a crystallization temperature or higher in order to improve material anisotropy. Meanwhile, in bainite transformation, a microstructure is differentiated into multiple variants in order to internally accommodate shear deformation involved in phase transformation. Due to the characteristics, in bainite produced by shear transformation, the formation of texture is less sensitive to a rolling temperature, as compared with ferrite produced by diffusion transformation. However, when a rolling temperature is low and the accumulated deformation amount of austenite is large, the production of variants may selectively occur in a direction of offsetting the internal deformation amount of austenite, and in this case, texture is formed to deteriorate anisotropy. Therefore, it is preferable that a rolling end temperature is performed at a temperature defined in Relation 1 or higher.

Meanwhile, the crystal grain size of austenite after hot rolling is affected by alloy components, a rolling end temperature, and a reduction amount, and affects the production behavior of ferrite and bainite in a subsequent cooling process and a final microstructure. The size of martensite/austenite (MA) composite phase which is one of important composite phases in the present disclosure increases as the size of an austenite crystal grain size after hot rolling is larger. In the present disclosure, it was confirmed that under the conditions that the sum of final reduction rates is 10 to 40%, the crystal grain size of austenite maybe calculated as Du of Relation 2 depending on a rolling end temperature and the kind of added alloy elements, and when the value is more than 10, the crystal grain size of the martensite/austenite (MA) composite phase is more than 2 μm and hole expandability is deteriorated.

Cooling Step

After the hot rolling, it is preferable that a hot rolled steel sheet is first cooled to the temperature T1 satisfying the following Relation 3 between Ms and 520° C. at a cooling rate of 50° C./s or more, and then is second cooled to a coiling temperature between T1 and Ms-50° C. at a cooling rate of 50° C./s or less.

The density of a dislocation produced in bainite transformation is slowly decreased by a recovery phenomenon, and the higher a bainite transformation temperature is, the higher a degree of dislocation density loss is. Since the bainite transformation temperature should be 520° C. or lower in order to maintain the dislocation density intended in the present disclosure, it is preferable that the upper limit of T1 which is a first cooling end temperature is 520° C. However, when the first cooling end temperature is Ms or lower, martensite transformation rapidly proceeds, and the fraction of martensite/austenite (MA) composite phase is excessively increased. Therefore, it is preferable that T1 which is the first cooling end temperature is Ms to 520° C.

Meanwhile, in the present disclosure, since the sum of area fractions of bainitic ferrite and the martensite/austenite (MA) composite phase should be 95% or more, the production of granular ferrite produced in the first cooling process should be effectively suppressed. When the alloy composition suggested in the present disclosure satisfies Relation 2 and the first cooling rate is 50° C./s or more, it was confirmed that it is possible to manage the production of granular ferrite to less than 5%. Though the upper limit of the first cooling rate is not particularly limited, when a steel sheet is rapidly cooled, a sheet shape may be distorted, and thus, it is preferable to control it to 200° C./s or less.

Furthermore, the present inventors confirmed that it is possible to manufacture a steel sheet having excellent strength with a steel having an alloy composition suggested in the present disclosure, but in order to overcome a phenomenon in which workability of a subsequent process is deteriorated by buckling after coiling, repeated study and experimentation. As a result, it was confirmed that the cause of buckling occurrence is that the amount of bainite formed before coiling is insignificant and phase transformation proceeds after coiling, so that buckling occurs by transformation plasticity. Further, it was confirmed that in order to prevent buckling occurrence after coiling, the production of bainite in the cooling step before coiling should be 60% or more. However, in order to increase the production fraction of bainite before coiling, it is most effective to increase a maintenance time before coiling.

Since rolling-cooling-coiling proceed by equipment listed in succession in a manufacturing process of steel products, there is a method of increasing the length of a cooling zone or lowering a rolling speed in order to increase the maintenance time before coiling. However, since there is a cost to increase the length of a cooling zone and slowing down a rolling speed causes reduced productivity, so that a time to pass through a cooling zone is bound to be limited in a common hot rolling manufacturing process. Therefore, the present disclosure is characterized by securing the fraction of a bainite transformation amount before coiling to a level in which bulking does not occur at a given time.

The present inventors confirmed that the fraction of completed phase transformation in the cooling zone before coiling should be 60% or more in order for buckling not to occur, and found that a first cooling end temperature should be within a T1 temperature range defined by the following Relation 3 while satisfying a range of Ms to 520° C., considering that a cooling time which may be secured in a common hot rolling process is within 15 seconds.

$$k(t) = \frac{20}{D_u}\exp\left\{-\left(\frac{T_1 + 273 - T_D}{112}\right)^{1.92}\right\} \geq 7.0 \times 10^{-3}$$ [Relation 3]

wherein, Ms is a temperature at which martensite production starts by cooling with Ms=550−330×[C]−41×[Mn]−20×[Cr]−10×[Mo]+30×[Al]−20×[Si], in ° C., and each element refers to % by weight thereof.

Further, in the present disclosure, after the first cooling, second cooling is performed to a coiling temperature between $T_1$ and Ms−50° C. at a cooling rate of 50° C./s or less. While the second cooling proceeds, bainite transformation proceeds to stabilize austenite, and thus, a substantial Ms temperature is lowered. Therefore, it is possible to apply the lower limit of a second cooling end temperature to be lower than an Ms temperature in which carbon concentration into untransformed austenite is not considered, and when bainite transformation proceeds to 60% or more, a temperature of Ms−50° C. or higher may be applied. Since bainite transformation proceeds in the second cooling, a rapid temperature change may cause distortion of sheet shape, and thus, the upper limit of the second cooling rate is set to 50° C./s.

Coiling and Final Cooling Step

Subsequently, the hot rolled steel sheet which is first cooled and second cooled is coiled at a second cooling end temperature, and is finally cooled to room temperature.

In the present disclosure, the finally cooled steel sheet may be further pickled and oiled.

In addition, after the pickling, the steel sheet may be heated to a temperature within a range of 400 to 750° C. to apply a hot dip galvanizing process. The hot dip galvanizing process may use zinc-based plating, and an alloy composition in the zinc-based plating bath is not particularly limited.

Mode for Invention

Hereinafter, the present disclosure will be described in detail by the following examples.

Examples

Steel slabs having the alloy compositions of the following Table 1 were prepared, and the residual components of the alloy compositions were Fe and inevitable impurities. The thus-prepared steel slabs were manufactured into hot rolled steel sheets according to the manufacturing conditions of Table 2. Specifically, the reheating temperature of the steel slab was 1200° C., the thickness of the hot rolled steel sheet after hot rolling was 2.6 mm, and the sum of the final 2 passes of finish rolling was 25%, identically. Cooling immediately after hot rolling was performed at a cooling rate of 60 to 70° C./s, and a maintenance time from the first cooling to the second cooling was applied as 15 seconds. Meanwhile, in the following Table 2, whether Relations 1 to 3 described above were satisfied was indicated as o and x, and o shows that the relation was satisfied and x shows that the relation was not satisfied.

The mechanical properties of each of the hot rolled steel sheets manufactured above, which are yield strength (YS), a tensile strength (TS), an elongation (El), a difference in an elongation between an orthogonal rolling direction and a vertical rolling direction (Del_El), and hole expandability (HER) were measured and are shown in the following Table 3. Then, the microstructure of each hot rolled steel sheet manufactured above was observed, and the results are also shown in the following Table 3.

Meanwhile, in the present disclosure, the yield strength and the elongation show a 0.2% off-set yield strength and an elongation at break, respectively. Further, the measurements of the yield strength, the tensile strength, and the elongation are results values obtained by collecting and testing a specimen of the JIS-5 standard in a direction perpendicular to a rolling direction. Meanwhile, Del_El is a result value showing a difference between an elongation at break of the specimen of the standard, measured in a direction parallel to a rolling direction and an elongation at break measured at a direction perpendicular to a rolling direction.

In addition, the fractions of bainitic ferrite and a martensite/austenite (MA) composite phase formed into a microstructure in steel were obtained by etching a specimen by a LePera etching method and then performing analysis at 1000× magnification using an optical microscope and an image analyzer. Then, the intragrain orientation difference of bainitic ferrite was measured using electron back scattered diffraction.

Then, the electron back scattered diffraction used a measuring instrument mounted on a scanning electron microscope at an acceleration voltage of 20 kV and applied an interval of 70 nm to perform measurement on an area of 50 μm×50 μm, and an OIM Analysis™ analysis program was used.

TABLE 1

| | Steel composition component (wt %) | | | | | | | | | | |
|---|---|---|---|---|---|---|---|---|---|---|---|
| | C | Si | Mn | P | S | Sol. Al | Cr | Mo | Ti | Nb | N |
| Inventive steel 1 | 0.08 | 0.5 | 2.1 | 0.012 | 0.004 | 0.03 | 0.3 | 0 | 0.03 | 0.02 | 0.0046 |
| Inventive steel 2 | 0.10 | 0.5 | 2.1 | 0.011 | 0.003 | 0.03 | 0.3 | 0 | 0.03 | 0.02 | 0.0045 |
| Inventive steel 3 | 0.08 | 0.2 | 2.3 | 0.011 | 0.003 | 0.03 | 0.8 | 0 | 0.03 | 0.02 | 0.0039 |

TABLE 1-continued

| | Steel composition component (wt %) | | | | | | | | | | |
|---|---|---|---|---|---|---|---|---|---|---|---|
| | C | Si | Mn | P | S | Sol. Al | Cr | Mo | Ti | Nb | N |
| Inventive steel 4 | 0.06 | 0.9 | 2.3 | 0.013 | 0.004 | 0.03 | 0.6 | 0 | 0.04 | 0.02 | 0.0049 |
| Inventive steel 5 | 0.06 | 0.3 | 2.5 | 0.015 | 0.004 | 0.02 | 0.2 | 0.2 | 0.06 | 0.02 | 0.0038 |
| Inventive steel 6 | 0.12 | 0.3 | 2.1 | 0.009 | 0.003 | 0.03 | 0 | 0.2 | 0.04 | 0.02 | 0.0041 |
| Inventive steel 7 | 0.08 | 1.2 | 2.3 | 0.011 | 0.002 | 0.03 | 0.6 | 0 | 0 | 0 | 0.0042 |
| Inventive steel 8 | 0.08 | 0.5 | 1.5 | 0.011 | 0.003 | 0.03 | 0.3 | 0 | 0.03 | 0.02 | 0.0041 |
| Comparative steel 1 | 0.04 | 0.3 | 2.1 | 0.009 | 0.004 | 0.02 | 0.6 | 0.2 | 0 | 0 | 0.0039 |
| Comparative steel 2 | 0.08 | 0.5 | 3.5 | 0.013 | 0.003 | 0.03 | 0.3 | 0 | 0.03 | 0.02 | 0.0045 |
| Comparative steel 3 | 0.08 | 1.5 | 2.1 | 0.014 | 0.004 | 0.03 | 2.5 | 0 | 0.03 | 0.02 | 0.0038 |

TABLE 2

| Classification | Steel type | FDT (° C.) | First cooling end temperature (° C.) | Second cooling end temperature (° C.) | Second cooling rate (° C./s) | Relation 1 | Relation 2 | Relation 3 |
|---|---|---|---|---|---|---|---|---|
| Inventive Example 1 | Inventive steel 1 | 921 | 502 | 446 | 3.7 | ○ | ○ | ○ |
| Inventive Example 2 | Inventive steel 1 | 919 | 460 | 441 | 1.3 | ○ | ○ | ○ |
| Inventive Example 3 | Inventive steel 1 | 878 | 462 | 441 | 1.4 | ○ | ○ | ○ |
| Inventive Example 4 | Inventive steel 2 | 922 | 482 | 452 | 2.0 | ○ | ○ | ○ |
| Inventive Example 5 | Inventive steel 3 | 920 | 487 | 451 | 2.4 | ○ | ○ | ○ |
| Inventive Example 6 | Inventive steel 3 | 909 | 509 | 482 | 1.8 | ○ | ○ | ○ |
| Inventive Example 7 | Inventive steel 4 | 922 | 477 | 461 | 1.1 | ○ | ○ | ○ |
| Inventive Example 8 | Inventive steel 5 | 923 | 479 | 451 | 1.9 | ○ | ○ | ○ |
| Inventive Example 9 | Inventive steel 6 | 921 | 479 | 451 | 1.9 | ○ | ○ | ○ |
| Inventive Example 10 | Inventive steel 7 | 918 | 481 | 448 | 2.2 | ○ | ○ | ○ |
| Inventive Example 11 | Inventive steel 7 | 917 | 462 | 439 | 1.5 | ○ | ○ | ○ |
| Inventive Example 12 | Inventive steel 7 | 877 | 461 | 434 | 1.8 | ○ | ○ | ○ |
| Inventive Example 13 | Inventive steel 8 | 918 | 479 | 461 | 1.2 | ○ | ○ | ○ |
| Inventive Example 14 | Inventive steel 8 | 920 | 475 | 441 | 2.3 | ○ | ○ | ○ |
| Comparative Example 1 | Comparative steel 1 | 923 | 473 | 441 | 2.1 | ○ | ○ | ○ |
| Comparative Example 2 | Comparative steel 2 | 921 | 493 | 449 | 2.9 | ○ | ○ | x |
| Comparative Example 3 | Comparative steel 3 | 923 | 483 | 449 | 2.3 | ○ | ○ | x |
| Comparative Example 4 | Inventive steel 1 | 917 | 552 | 526 | 1.7 | ○ | ○ | ○ |
| Comparative Example 5 | Inventive steel 1 | 834 | 481 | 461 | 1.3 | x | ○ | ○ |
| Comparative Example 6 | Inventive steel 7 | 921 | 551 | 531 | 1.3 | ○ | ○ | x |
| Comparative Example 7 | Inventive steel 7 | 964 | 483 | 452 | 2.1 | ○ | x | ○ |

TABLE 3

| Classification | Bainitic ferrite Fraction (%) | Fraction at 1.5° to 10.5° (%) | Martensite/austenite composite phase Fraction (%) | Average particle diameter (μm) | Interval (μm) | Mechanical properties YP (MPa) | TS (MPa) | EL (%) | Del-El (%) | HER (%) |
|---|---|---|---|---|---|---|---|---|---|---|
| Inventive Example 1 | 81 | 65 | 19 | 1.6 | 0.8 | 863 | 1075 | 11.5 | 2.1 | 39 |
| Inventive Example 2 | 75 | 74 | 25 | 1.7 | 0.9 | 920 | 1125 | 10.4 | 2.1 | 38 |
| Inventive Example 3 | 75 | 73 | 25 | 1.3 | 0.7 | 947 | 1164 | 9.9 | 2.3 | 34 |
| Inventive Example 4 | 67 | 70 | 33 | 1.7 | 0.8 | 942 | 1176 | 10.3 | 2.1 | 32 |
| Inventive Example 5 | 76 | 68 | 24 | 1.7 | 0.9 | 869 | 1076 | 11.6 | 2.3 | 40 |
| Inventive Example 6 | 79 | 61 | 21 | 1.5 | 0.9 | 794 | 1001 | 13.1 | 2.4 | 43 |
| Inventive Example 7 | 85 | 69 | 15 | 1.5 | 1.0 | 803 | 984 | 12.8 | 2.0 | 47 |
| Inventive Example 8 | 84 | 71 | 16 | 1.5 | 0.9 | 826 | 1011 | 12.7 | 2.3 | 45 |
| Inventive Example 9 | 59 | 69 | 41 | 1.7 | 0.7 | 1006 | 1264 | 8.7 | 2.2 | 25 |
| Inventive Example 10 | 75 | 71 | 25 | 1.9 | 1.0 | 873 | 1077 | 11.7 | 1.8 | 40 |
| Inventive Example 11 | 74 | 76 | 26 | 2.0 | 1.0 | 913 | 1114 | 10.9 | 1.8 | 39 |
| Inventive Example 12 | 75 | 76 | 55 | 1.6 | 0.8 | 939 | 1147 | 10.4 | 2.0 | 36 |
| Inventive Example 13 | 77 | 69 | 23 | 1.7 | 0.9 | 859 | 1064 | 11.8 | 2.0 | 41 |
| Inventive Example 14 | 74 | 72 | 26 | 1.7 | 0.9 | 904 | 1112 | 10.9 | 2.0 | 38 |
| Comparative Example 1 | 91 | 55 | 9 | 2.3 | 2.0 | 770 | 923 | 13.6 | 2.0 | 54 |
| Comparative Example 2 | 75 | 67 | 25 | 1.6 | 0.8 | 873 | 1085 | 11.5 | 2.4 | 39 |
| Comparative Example 3 | 75 | 70 | 25 | 1.4 | 0.7 | 903 | 1121 | 11.0 | 2.0 | 36 |
| Comparative Example 4 | 84 | 38 | 16 | 1.4 | 0.9 | 687 | 888 | 15.4 | 2.1 | 48 |
| Comparative Example 5 | 77 | 69 | 23 | 0.7 | 0.4 | 940 | 1202 | 7.8 | 3.8 | 27 |
| Comparative Example 6 | 84 | 48 | 16 | 1.7 | 1.1 | 666 | 861 | 15.9 | 1.8 | 50 |
| Comparative Example 7 | 76 | 63 | 24 | 2.4 | 1.3 | 798 | 1024 | 11.8 | 1.5 | 23 |

As shown in Tables 1 to 3, in Inventive Examples 1 to 14 satisfying all of the alloy compositions and the manufacturing conditions suggested in the present disclosure, it was found that the area fraction of bainitic ferrite was 55% or more, the area fraction of martensite/austenite (MA) composite phase was 10% or more, and the total area fraction of the structure was 95% or more, in the microstructure. In addition, since the martensite/austenite (MA) composite phase satisfied an average particle diameter of 2.0 μm or less and an average interval of the composite phase of 0.3 μm or more, strength and formability to be intended were able to be secured.

Accordingly, it was found that the steel sheet of the present disclosure may secure the yield strength of 750 MPa or more, the tensile strength of 950 MPa or more, the elongation of 8% or more, De_El of less than 3%, and HER of 25% or more.

However, in Comparative Example 1, a C content was less than 0.05%, and the martensite/austenite (MA) composite phase was not able to secure an area fraction of 10%, and thus, the tensile strength of 950 MPa or more was not able to be secured.

In Comparative Example 2, a Mn content was excessively high so that a sufficient amount of bainite transformation was not performed before coiling, and thus, there was a risk of buckling occurrence after coiling.

In Comparative Example 3, a Cr content was excessively high so that a sufficient amount of bainite transformation was not performed before coiling, and thus, there was a risk of buckling occurrence after coiling.

In Comparative Example 4, the first cooling end temperature and the second cooling end temperature were too high, so that a loss of dislocation inside bainitic ferrite excessively occurs, and thus, an area fraction having a bainitic ferrite intragrain orientation difference within 1.5° to 10.5° of 55% or more was not able to be secured, and the yield strength and the tensile strength were poor.

In Comparative Example 5, the rolling end temperature was too low, so that Relation 1 is not satisfied and variants were selectively produced to cause excessive occurrence of material anisotropy, and thus, a difference in elongations in each measurement direction was more than 3%.

In Comparative Example 6, the first cooling end temperature and the second cooling end temperature were too high, so that dislocations inside bainitic ferrite were excessively lost to deteriorate the yield strength, and also, Relation 3 was not satisfied. Therefore, a bainite transformation speed was slow, so that the amount of bainite transformed before winding of 60% or more was not able to be secured, and thus, there was a risk of buckling occurrence after coiling together with a poor material problem.

In Comparative Example 7, the rolling temperature end temperature was too high, so that Relation 2 was not satisfied, and the particle diameter of the martensite/austenite (MA) composite phase was excessively coarse. As a result, the hole expandability of 25% or more was not able to be secured.

FIG. 1 is an image in which the steel microstructure in an exemplary embodiment in the present disclosure is observed by a rear electron diffraction scattering method attached to a scanning electron microscope, in which (a) shows the case of Inventive Example 1, and (b) shows the case of Comparative Example 4. In each photograph, a black color shows the martensite/austenite (MA) composite phase, a white color shows an area in which a bainitic ferrite intragrain orientation difference was less than 1.5°, and a gray color shows an area in which a bainitic ferrite intragrain orientation difference was 1.5° to 10.5°.

As described above, the preferable exemplary embodiments of the present disclosure have been described, various modifications are possible without departing from the scope of the present disclosure by a person skilled in the art to which the present disclosure pertains, of course. Accordingly, the right scope of the present disclosure should not be limited to the exemplary embodiments described, and should be defined by the appended claims and equivalents thereto.

The invention claimed is:

1. A high-strength hot rolled steel sheet having an excellent yield strength comprising, by weight: 0.05 to 0.13% of carbon (C), 0.2 to 2.0% of silicon (Si), 1.3 to 3.0% of manganese (Mn), 0.01 to 0.1% of aluminum (Al), 0.001 to 0.05% of phosphorus (P), 0.001 to 0.05% of sulfur(S), and 0.001 to 0.02% of nitrogen (N), with a balance of Fe and other inevitable impurities,
   wherein a steel microstructure includes, by area: 55% or more of bainitic ferrite and 10% or more of a martensite/austenite (MA) composite phase, the sum of the bainitic ferrite and the martensite/austenite (MA) composite phase being 95% or more and the remaining total being less than 5% of granular ferrite, residual austenite, and carbides,
   in the bainitic ferrite, an area fraction of bainitic ferrite having an intragrain orientation difference of 1.5° or more and 10.5° or less is 55% or more of the total area of the bainitic ferrite, and
   the martensite/austenite (MA) composite phase has an average particle diameter of 2.0 μm or less and an average interval of 0.3 μm or more.

2. The high-strength hot rolled steel sheet having an excellent yield strength of claim 1, further comprising one or more of, by weight: 0.01 to 2.0% of chromium (Cr), 0.01 to 2.0% of molybdenum (Mo), 0.01 to 0.2% of titanium (Ti), and 0.01 to 0.1% of niobium (Nb).

3. The high-strength hot rolled steel sheet having an excellent yield strength of claim 1, wherein the martensite/austenite (MA) composite phase has an area fraction of 10 to 45%.

4. The high-strength hot rolled steel sheet having an excellent yield strength of claim 1, wherein the hot rolled steel sheet has yield strength of 750 MPa or more, a tensile strength of 950 MPa or more, an elongation of 8% or more, a hole expandability of 25% or more, and a difference in elongations measured in a vertical rolling direction and a parallel rolling direction of 3% or less.

5. A method for manufacturing a high-strength hot rolled steel sheet having an excellent yield strength, the method comprising:
   heating a steel slab including, by weight: 0.05 to 0.13% of carbon (C), 0.2 to 2.0% of silicon (Si), 1.3 to 3.0% of manganese (Mn), 0.01 to 0.1% of aluminum (Al), 0.001 to 0.05% of phosphorus (P), 0.001 to 0.05% of sulfur(S), and 0.001 to 0.02% of nitrogen (N), with a balance of Fe and other inevitable impurities at 1100 to 1350° C.;
   finish hot rolling the heated steel slab while controlling the sum of reduction amounts of final two rolling passes to 10 to 40% in which FDT (° C.) which is a temperature of a hot rolled sheet immediately after the finish hot rolling satisfies the following Relations 1 and 2 at a temperature between 750° C. and 1150° C.;
   first cooling the hot rolled steel sheet to a temperature of T1 defined in the following Relation 3 or lower between Ms and 520° C. at a cooling rate of 50° C./s or more, and then, second cooling the steel sheet to a coiling temperature between $T_1$ and Ms-50° C. at a cooling rate of 50° C./s or less; and
   finally cooling the hot rolled steel sheet coiled after the second cooling to room temperature:

[Relation 1]

FDT ≥Tnr–50° C.

wherein Tnr is a temperature at which recrystallization delay starts with Tnr=795+88×[C]+45×[Mn]+23×[Cr]+760×[Ti]+480×[Nb]–80×[Si], and each element refers to % by weight thereof,

[Relation 2]

Du=3.7+0.36×[C]–1.21×[Si]–0.23×[Mn]+0.19×[Cr]–41.63×[Ti]–54.44×[Nb]+0.049×[FDT-773]≤10, wherein Du is an indicator showing an effective crystal grain size of austenite immediately before the first cooling after the finish hot rolling, and each element refers to % by weight thereof, $$k(t) = \frac{20}{D_u}\exp\left\{-\left(\frac{T_1 + 273 - T_D}{112}\right)^{1.92}\right\} \geq 7.0 \times 10^{-3} \quad \text{[Relation 3]}$$

wherein $T_D$=820–290×[C]–90×[Mn]–70×[Cr]–62×[Mo]–35×[Si], and each element refers to weight contents thereof,
wherein Ms is a temperature at which martensite production starts by cooling with Ms=550–330×[C]–41×[Mn]–20×[Cr]–10×[Mo]+30×[Al]–20×[Si], in ° C., and each element refers to % by weight thereof.

6. The method for manufacturing a high-strength hot rolled steel sheet having an excellent yield strength of claim 5, wherein the hot rolled steel sheet further includes one or more of, by weight: 0.01 to 2.0% of chromium (Cr), 0.01 to 2.0% of molybdenum (Mo), 0.01 to 0.2% of titanium (Ti), and 0.01 to 0.1% of niobium (Nb).

7. The method for manufacturing a high-strength hot rolled steel sheet having an excellent yield strength of claim 5, further comprising: pickling and oiling the finally cooled steel sheet.

8. The method for manufacturing a high-strength hot rolled steel sheet having an excellent yield strength of claim 5, further comprising: after the pickling, heating the finally cooled steel sheet to a temperature within a range of 400 to 750° C. to perform hot dip galvanizing.

* * * * *